E. H. McHENRY.
ACCELEROMETER.
APPLICATION FILED JUNE 20, 1917.
1,280,508.
Patented Oct. 1, 1918.
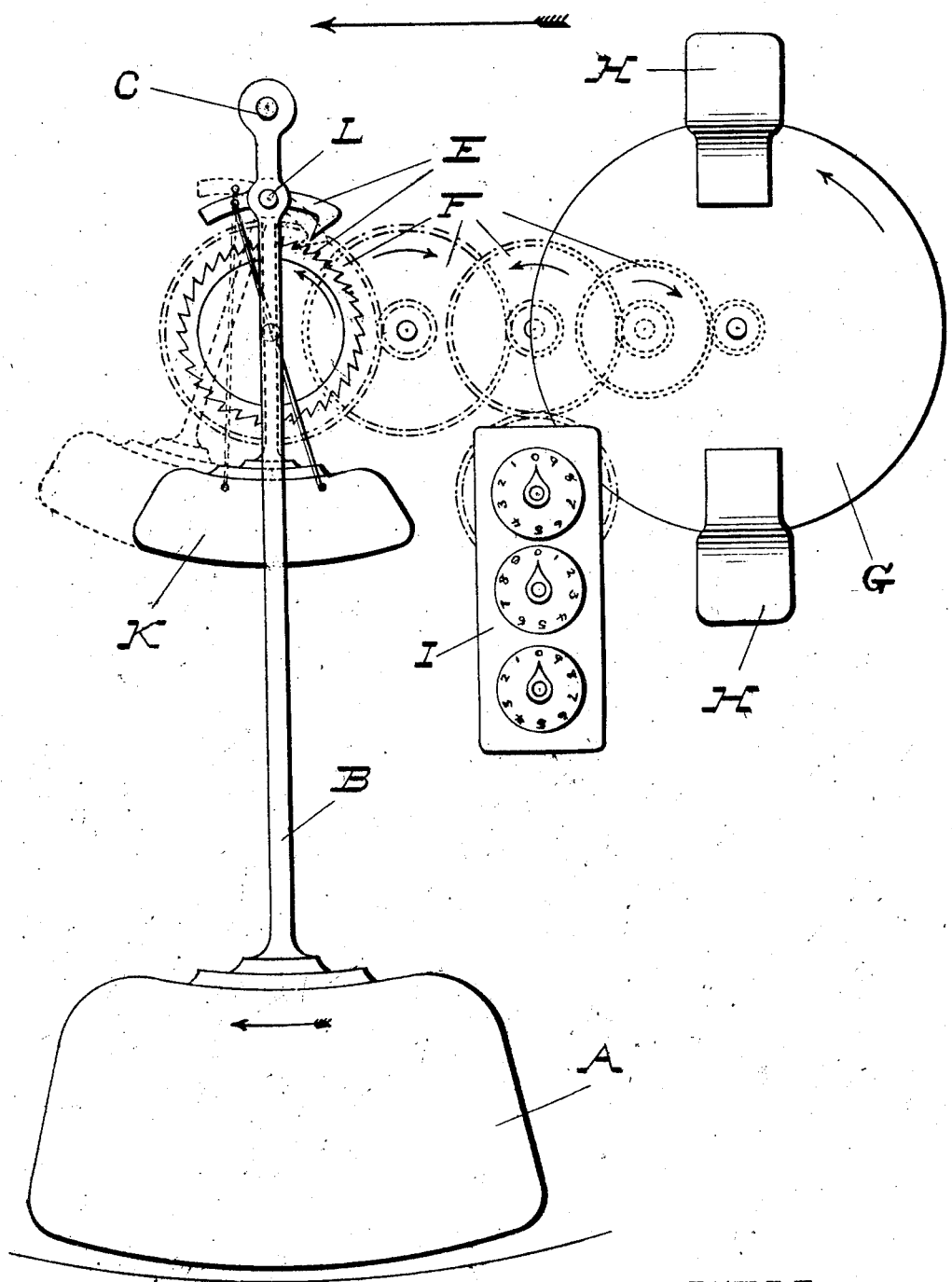

UNITED STATES PATENT OFFICE.

EDWIN H. McHENRY, OF NEW HAVEN, CONNECTICUT.

ACCELEROMETER.

1,280,508.   Specification of Letters Patent.   Patented Oct. 1, 1918.

Application filed June 20, 1917. Serial No. 175,840.

*To all whom it may concern:*

Be it known that I, EDWIN H. McHENRY, a citizen of the United States, residing at New Haven, in the county of New Haven and State of Connecticut, have invented certain new and useful Improvements in Accelerometers, of which the following is a specification, reference being had therein to the accompanying drawings.

The present invention relates to instruments known as accelerometers and it is the special purpose of my invention to provide means for the direct measurement of the energy of motion of trains and cars which is absorbed in friction by the application of brakes when stopping or slowing down.

In practical application, the function of the device will be to insure that the train speeds immediately preceding the application of brakes shall be at minimum rates and consequently that the loss of the kinetic energy to be absorbed by the brakes will be minimum in amount. Low final velocity of trains or cars in combination with the maintenance of the normal time schedules, requires high initial rates of acceleration and speed and maximum coasting intervals, in order to afford greatest economy in the use of power. Savings of 20% or more are frequently secured by the practical application of this principle to the operation of trains or cars.

Many forms of "coasting clocks" and braking recorders are in use for this purpose, none of which it is believed afford a direct index of the kinetic energy absorbed by the brakes but depend upon indirect methods for securing the desired results; such as the measurement of the duration of the times of coasting or of braking in combination with the relation of such intervals of time to the total elapsed time between terminals. The results obtained by such methods are relative rather than absolute and generally require the compilation and final reduction of more or less complicated and expensive records and also incur additional trouble and cost for their installation on cars or engines including pneumatic, electrical or mechanical connection between motors, brakes, time clocks and recording instruments.

The substitution of direct for indirect measurement of the energy consumed by the brakes, will either eliminate or much reduce the necessity for keeping correlated records of time schedules, car weights, length of runs, delays, etc.

My device is self-contained and readily portable and its use will greatly reduce the number, volume and cost of special records, as it records the energy losses per unit of weight, of all classes of equipment, thus eliminating any necessity for tedious reductions of total weights, to a unit basis in terms of tons or otherwise; and being conveniently portable it also permits the ready segregation of the individual records of engineers and motormen from that of the engine or car. The addition of a simple star wheel attachment and recorder will still further simplify the records by recording the number of stops, thus affording an expression of results in final terms of energy consumed per unit stop or "slow down."

My device also eliminates all errors due to efficiency losses of all kinds as it records the loss of the net energy only which is actually absorbed by braking friction.

The accompanying drawing illustrates diagrammatically one mode and means for applying the principle or principles involved in the invention, which will now be more particularly described with reference to said drawings.

In the diagram the pendulum (A) is suspended by a rod (B) from a point (C) and moves through an arc (D) when acted upon by gravity or by its inertia under conditions of acceleration or retardation. The motion of the pendulum may be applied to drive a clock-work train by suitable means such as a ratchet and pawl (E) pivoted upon the suspension arm (B) and engaging with a fixed clock-work train (F) as shown, the gear ratios of which are such as to afford a relatively high angular velocity at one end of the train with greatly reduced speed at the point of engagement (E) with the pendulum at the other end. The terminal member (G) of the clock-work train as shown, is a metallic disk preferably of copper or aluminum, revolving between the poles of fixed permanent magnets (H). In accordance with well known principles, the resistance of the disk to rotation under such conditions will vary directly with the force applied, thus affording means for the direct integration of both the intensity and duration of the force applied to drive the clock-work train which permits the measurement and a record of the energy consumed, by an ordinary dial train (I) geared to one of the rotating elements of the clock-work train (F).

The force acting to drive the clock-work train with its terminal load is determined by,—

1st: The rate of acceleration (or retardation).

2nd: The mass of the pendulum (or other mobile weight).

3rd: The ratio of the moments of leverage, if any, from a common center or fulcrum to the center of gravity of the mass of the pendulum and to the point of application of the load.

The pawl and ratchet (E) are not normally engaged as otherwise any change in the position of the mechanism from a horizontal plane, occasioned by gradients or otherwise would cause a change in the relative angular position of the pendulum and thus introduce a source of error, and accordingly additional means are provided for avoiding such errors consisting of a secondary pendulum or weight (K) pivoted upon the primary pendulum at some point (L) which will not change its axis in relation to the axis of the primary pendulum (A) when acted upon by gravity, but will change such relative position when acted upon by accelerating or retarding forces in the direction of motion, and in doing so will cause the engagement of the pawl and ratchet (E).

It is evident that the utilization of the inertia of a body to drive an integrating clock-work train is not confined to this special form of construction and is not dependent upon the use of one or more simple pendulums as shown; as the inertia of any mobile weight (solid or fluid) may be applied to perform the same function. Also it is not necessary that the form of construction shall include the use of a magnetic load as shown, as any load which is proportional to the force applied, will obviously serve the same purpose.

In practical use an accelerometer, as above described, when placed in proper position in relation to the direction of motion will indicate or record both the intensity and duration of forces tending to increase or to arrest the motion of any vehicle in which it may be carried, which is the object sought.

There are minor changes and alterations that can be made within my invention, and I would therefore have it understood that I do not limit myself to the exact construction herein shown and described but claim all that falls fairly within the spirit and scope of the appended claims.

Having described my invention, what I claim as new, and desire to secure by Letters Patent, is:—

1. In a device of the character described, a suspended movable primary weight; a movable secondary weight suspended from said primary weight; measuring and integrating mechanism; and means operated by said secondary weight for operatively connecting said primary weight with said measuring and integrating mechanism.

2. In a device of the character described, a primary mobile weight; a secondary mobile weight; mechanism for measuring the movement of said primary weight; means operated by said secondary weight for connecting said mechanism with said primary weight; and means for retarding the motion of said mechanism.

3. In a device of the character described, a movable primary body pivoted at a stationary point; a movable secondary body pivoted at a movable point; clockwork mechanism driven by said primary body; means operated by said secondary body for operatively connecting said clockwork mechanism with said primary body; and a resistance device comprising a disk geared with said clockwork mechanism and revolving between the poles of permanent magnets.

4. In an accelerometer, a primary pendulum suspended from a stationary point; a secondary pendulum suspended from said primary pendulum; a pawl mounted on said primary pendulum; a connection between said secondary pendulum and said pawl whereby the latter is operated; a ratchet wheel engaged by said pawl; a clockwork train of gearing driven by said ratchet wheel; counting mechanism geared with said clockwork train; and a resistance device comprising a disk geared with said clockwork train and revolving between poles of permanent magnets.

In testimony whereof I have hereunto affixed my signature.

EDWIN H. McHENRY.